(12) United States Patent
Passaglia et al.

(10) Patent No.: US 11,606,687 B1
(45) Date of Patent: Mar. 14, 2023

(54) ANONYMIZED BLUETOOTH BEACONS

(71) Applicant: Amazon Technologies, Inc., Seattle, WA (US)

(72) Inventors: Abraham Martin Passaglia, Seattle, WA (US); Andrew Roths, Kenmore, WA (US); Neelam Rani, Sunnyvale, CA (US); Chris DeCenzo, Atherton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 16/712,719

(22) Filed: Dec. 12, 2019

(51) Int. Cl.
| H04L 9/32 | (2006.01) |
| H04W 12/033 | (2021.01) |
| H04L 9/08 | (2006.01) |
| H04W 12/06 | (2021.01) |
| H04W 4/80 | (2018.01) |
| H04W 12/04 | (2021.01) |
| H04L 9/06 | (2006.01) |
| H04W 12/47 | (2021.01) |
| H04W 12/61 | (2021.01) |
| H04W 12/63 | (2021.01) |
| H04W 12/71 | (2021.01) |

(52) U.S. Cl.
CPC ........ *H04W 12/033* (2021.01); *H04L 9/0631* (2013.01); *H04L 9/0869* (2013.01); *H04L 9/3242* (2013.01); *H04W 4/80* (2018.02); *H04W 12/04* (2013.01); *H04W 12/06* (2013.01); *H04W 12/47* (2021.01); *H04W 12/61* (2021.01); *H04W 12/63* (2021.01); *H04W 12/71* (2021.01)

(58) Field of Classification Search
CPC ... H04W 12/033; H04W 12/71; H04W 12/47; H04W 12/61; H04W 12/63; H04W 4/80; H04W 12/06; H04W 12/04; H04L 9/3242; H04L 9/0631; H04L 9/0869
See application file for complete search history.

(56) References Cited

U.S. PATENT DOCUMENTS

| 8,954,745 B2 * | 2/2015 | Cook | G06F 21/445 |
| | | | 380/46 |
| 9,537,657 B1 * | 1/2017 | Char | H04L 9/0637 |
| 2015/0121492 A1 * | 4/2015 | Cao | H04L 63/08 |
| | | | 726/6 |
| 2016/0105765 A1 * | 4/2016 | Farley | H04W 4/029 |
| | | | 455/456.1 |
| 2018/0041479 A1 * | 2/2018 | Wang | H04L 63/0838 |
| 2018/0159855 A1 * | 6/2018 | Ha | G06F 21/35 |
| 2019/0260730 A1 * | 8/2019 | Mainali | G06F 21/31 |
| 2019/0357040 A1 * | 11/2019 | Benoliel | H04L 9/3242 |
| 2020/0107165 A1 * | 4/2020 | Pai | H04L 9/3297 |
| 2021/0004786 A1 * | 1/2021 | Mossler | H04W 12/06 |

* cited by examiner

*Primary Examiner* — Cheng-Feng Huang
(74) *Attorney, Agent, or Firm* — Eversheds Sutherland (US) LLP

(57) ABSTRACT

Systems, methods, and computer-readable media are disclosed for systems and methods for sending and receiving anonymized signals or beacons. Example methods may include determining an authentication code and sending a signal associated with the authentication code from an electronic device to a server via a connected device. Example methods may include determining an authentication code by a server or a second electronic device and requesting signal information from the server corresponding to the signal associated with the authentication code.

15 Claims, 7 Drawing Sheets

US 11,606,687 B1

ANONYMIZED BLUETOOTH BEACONS

BACKGROUND

Electronic devices, such as smartphones, tablets, smartwatches, smart-sensors and the like, may move from one physical location to another. In some instances, users may wear, or carry on their person, one or more electronic devices. For example, a user may wear a smartwatch or carry a smartphone in their pocket. The electronic devices may communicate with other devices via one or more network connections. As these electronic devices often employ wireless connectivity having a relatively short range and may be on the move, electronic devices may be difficult to track. Further, as the electronic devices may send sensitive information wirelessly, there may be a need to keep this information confidential. For example, there may be a need to anonymize wireless communications.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
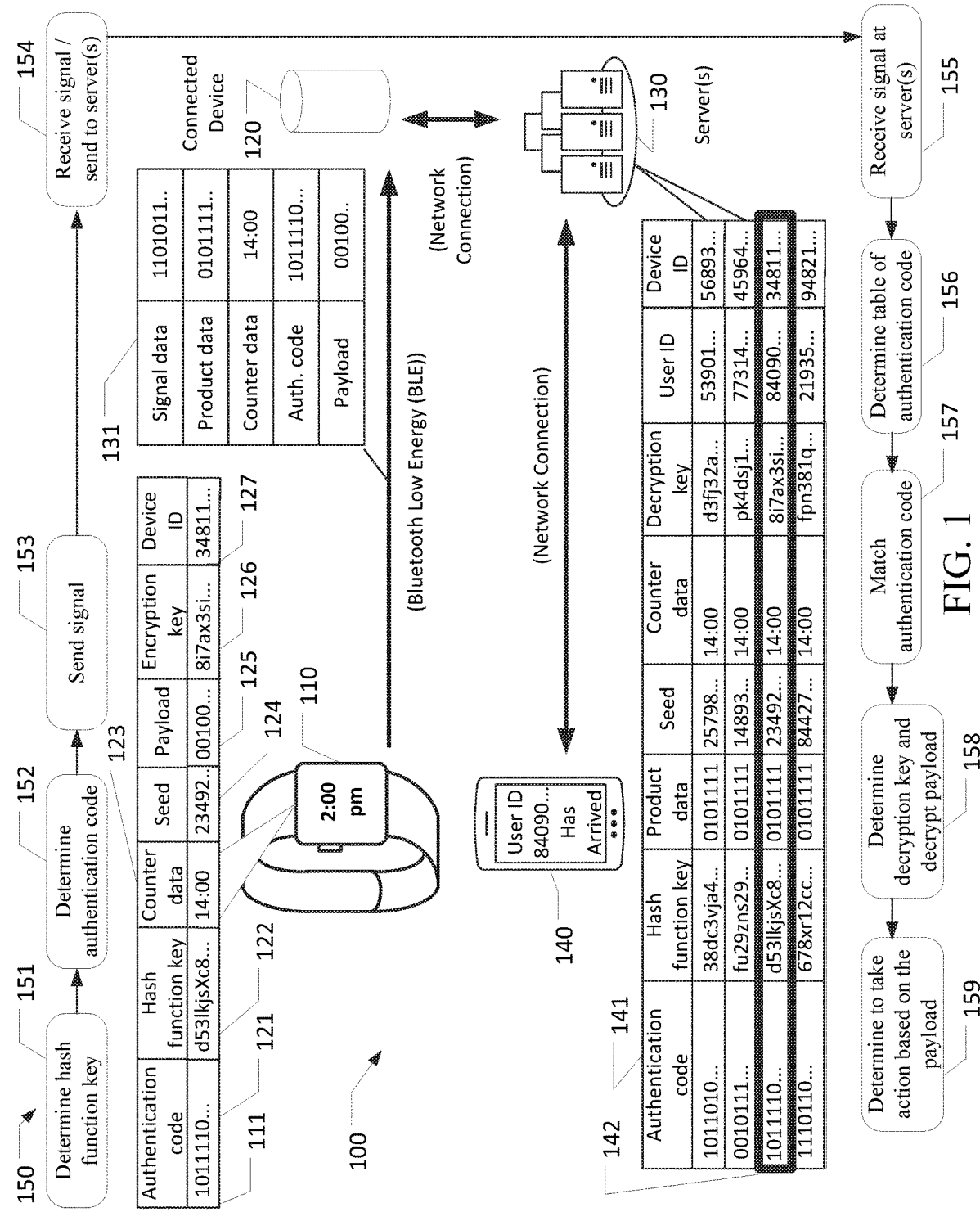
FIG. 1 is a schematic illustration of an example use case for a sending signal including an authentication codes from an electronic device to one or more servers via one or more connected devices in accordance with one or more example embodiments of the disclosure.

The systems and methods herein may be used to send signals, which may include encrypted information, from an electronic device to a server. The encrypted information may be decrypted by the server or by a second electronic device that receives the signal and/or encrypted information from the server. The signal may be sent from the electronic device to the server via a connected device (e.g., connected to the cloud and/or the Internet) that the electronic device communicates with over a short range communication protocol (e.g., Bluetooth or Bluetooth Low Energy (BLE)). Information in the signal may be decrypted and encrypted using a symmetric encryption key that is based on counter data (e.g., having a counter value) and a unique identifier associated with the electronic device. In this manner the electronic device may send encrypted information to a server that may be decrypted by the server or second electronic device. The encrypted information may be used to track the electronic device and/or may involve sensitive information about the electronic device. The server or second electronic device may determine to take an action or perform an operation or task based on the encrypted information and/or other information in the signal.

Electronic devices may include devices that a user can wear or keep on their person, or can otherwise take with them, such as in the user's pocket. Electronic devices may include smartphones, tables, smartwatches or bracelets, smart-glasses, electronic trackers, wearable smart-sensors, and so forth. Other electronic devices may be positioned or otherwise installed or coupled to an object such as electronic trackers, smart-sensors, and the like. Electronic devices may include a screen on which information, such as text, images, videos, or other information, can be presented or may be displayless (i.e., not include a display).

Electronic devices may communicate wirelessly with other devices. For example, a smartwatch may wirelessly communicate with a smartphone using Bluetooth or other wireless connection. Electronic devices may communicate with other devices via one or more well-known communication protocols and/or via one or more well-known communication networks. Users may use electronic devices to receive and/or send notifications, messages, or other information.

One electronic device may communicate via a short range communication protocol with another electronic device that may also be in communication with one or more remote servers via the internet. For example, a smartwatch may communicate with a connected device (e.g., device connected to the cloud and/or Internet) via Bluetooth or BLE, or any other short range communication protocol (e.g., near field communication protocol), and the connected device may communicate with servers via Wi-Fi® or a cellular network. In this manner the smartwatch may communicate with the connected device and the connected device may communicate with one or more servers. In one example, the connected device may be a smart home hub, smart speaker, or other wirelessly connected device.

Embodiments of the disclosure may include generating a signal (e.g., a beacon) by an electronic device, such as a smartwatch. The signal may include information specific to the signal (e.g., signal data), information about the electronic device (e.g., product data), counter or temporal information (e.g., counter data) corresponding to the signal and identifying a time or count value (e.g., counter value), and/or a unique code for identifying that signal (e.g., authentication code). The signal may also include a message (e.g., a payload). It may be desirable to encrypt some of the signal, such as the payload, so that devices may only view and/or process some of the signal. The authentication code may be determined based on a unique value associating the electronic device and a user account (e.g., a unique identifier), a unique value assigned to the electronic device (e.g., device identifier) as well as the counter data. Further the payload may be encrypted using an encryption key determined based on the unique identifier and the counter data.

The signal may be transmitted to a server by the electronic device via the connected device. The server may know the unique identifier and/or the device identifier for the electronic device from which the signal originated and may determine authentication codes based on the unique identifier, device identifier and/or certain counter data (e.g., the present time and/or time increments around the present time). The server may also determine a decryption key based on the unique identifier and/or counter data. The server may maintain a table of decryption keys and authentication codes corresponding to the unique identifier of the electronic device based on possible counter data. Upon receiving the signal from the electronic device, the server may match the authentication code in the signal to an authentication code in the table having the same value or having a truncated value that is the same. The server may then record the signal in connection with a user account associated with that electronic device. The server may use the decryption key corresponding to that authentication code to decrypt the payload in the corresponding signal. The server may determine to take an action based on the payload and may take the action. It is understood that the server described herein and the corresponding functionality could be implemented by other devices (e.g., two or more servers, etc.).

Embodiments of the disclosure may alternatively include a server that does not know the unique identifier and/or device identifier for the electronic device. Upon receiving the signal, the server may store the signal and/or information relating thereto in a database. The database may be searchable according to the authentication code in the signal. A second electronic device (e.g., a smart device) may know the unique identifier and/or device identifier corresponding to the electronic device from which the signal originated and may determine one or more authentication codes based on the unique identifier, device identifier and/or certain counter data (e.g., the present time). The second device may request information corresponding to the authentication code from the server. The server may search the database for a matching authentication code and may send the second electronic device information corresponding to the signal associated with authentication code. The information may include the payload. The second electronic device may also determine a decryption key based on the unique identifier and/or counter data. The second electronic device may use the decryption key to decrypt the payload. The second electronic device may determine to take an action based on the payload and may take the action.

The systems and methods herein may be used, for example, to determine a location of an electronic device, such as a smartwatch, at a certain time or period of time. For example, the electronic device may be programmed to periodically generate a signal (e.g., at certain times throughout the day). The signal may be sent via short range communication networks (e.g., BLE) to nearby connected devices (e.g., mobile devices, computing devices, tablets, etc.) that may send the signal to a server. The signal may include an authentication code unique to the electronic device and an encrypted payload with instructions. As explained below, the signal may include signal data that may identify the signal and may even instruct the receiving device to send the signal to the server (e.g., by identifying a server address). Upon receiving the signal, the server may determine a decryption key associated with the authentication code and may decrypt the payload. The payload may include instructions to generate or update a table (or record) of information associated with the electronic device and/or received from the electronic device. The table may include information about the connected device that sent the signal to the receiver, such as the location of the connected device over time. As nearfield communication networks may be used to send the signal from the electronic device to the connected device, it may be assumed that at the time the connected device received the signal, the electronic device was nearby. Thus, the server may maintain a table of each received signal that includes the time that it was received and the location of the connected device that sent the signal to the server. A second electronic device may be used to access the table to view the location of the device at the corresponding time points. For example, a mother may track the location of her child wearing the smartwatch throughout the day.

The systems and methods herein may be used, for example, to determine if the door of a safe protecting valuables has moved. The electronic device may be a smart-sensor in Bluetooth™ or BLE communication with a connected device. The smart-sensor may be attached to the door of a safe, may include an accelerometer, and may generate a message each time the door is moved. Upon being moved the smart-sensor may send a signal to a connected device (e.g., smart home hub, Wi-Fi® access point, or mobile device) via BLE and the connected device may send the signal to the server. The signal may include a payload that instructs the server to send a message to another device, such as a mobile device associated with the user account with which the smart-sensor is associated, that a safe door has been moved. The signal may include an authentication code and an encrypted payload. Upon receiving the signal, the server may match the authentication code to an authentication code in a database and may determine a corresponding decryption key. The server may use the decryption key to decrypt the payload and, based on the instructions in the payload, may determine to send a message to the mobile device that the safe door has moved.

Referring to FIG. 1, an example use case 100 for receiving a signal and identifying a corresponding record is depicted in accordance with one or more example embodiments of the disclosure. In the illustrated example, a connected device 120 may communicate with a server 130, which may be one or more servers, as well as an electronic device 110. Electronic device 140 may also be in communication with server 130. Electronic device 110 and electronic device 140 may be any electronic device that may communicate with electronic devices, connected device 120, server 130 and/or other computing devices via any well-known wired or wireless system (e.g., Bluetooth, Bluetooth Low Energy (BLE), near field communication protocol, Wi-Fi®, cellular network, etc.). Electronic device 110 and electronic device 140 may optionally include a user input (e.g., touch screen, buttons, microphone, keyboard, etc.) and may optionally include a display (e.g., screen). Electronic device 110 and electronic device 140 may be a computing device with a processor and may include one or more sensors. For example, electronic devices 110 and/or 140 may be wireless mobile devices such as smartphones, tables, smartwatches or bracelets, smart-glasses (or any other type or wearable), electronic trackers, smart-sensors, and the like. It is understood that electronic devices 110 and 140 may be the same or different devices. In the example illustrated in FIG. 1, electronic device 110 is a smartwatch with touchscreen display and electronic device 140 is a smartphone with a touchscreen display. Electronic device 110 is described in greater detail below with respect to FIG. 6. Connected device 120 may be an electronic device similar to or the same as electronic device 110 or electronic device 140, or it may be a wireless access point, smart home hub, or any other suitable wireless device. Connected device 120 is configured to communicate with both electronic device 110 and server 130. Server 130 may be one or more computing devices in communication with connected device 120 and electronic device 140. Server 130 is described in greater detail below with respect to FIG. 7.

Connected device 120 may communicate with electronic device 110 via one of more networks and may also communicate with server 130 via one or more networks. Additionally, server 130 may communicate with electronic device 140 via one or more networks. It is understood that these networks may be the same or different from one another. For example, electronic device 110 may communicate with connected device 120 via Bluetooth, Wi-Fi®, or BLE. Additionally, connected device 120 may communicate with server 130 over the Internet via Wi-Fi. Finally, server 130 may communicate with electronic device 140 via any suitable connection, such as a cellular network, Wi-Fi®, Bluetooth, BLE, etc.

To initiate the actions of determining and sending a signal to a server and receiving the signal by the server and determining a corresponding record, an example process flow 150 is presented and may be performed, for example, by one or more modules at electronic device 110, connected device 120, server 130, and/or electronic device 140. The electronic device 110, connected device 120, server 130, and/or electronic device 140 may include at least one memory that stores computer-executable instructions and at least one processor configured to access the at least one memory and execute the computer-executable instructions to perform various actions or operations, such as one or more of the operations in the process flow 150 of FIG. 1. It is understood that electronic device 110 may know a unique identifier 124 associated with the electronic device 110 and a user account, a device identifier 127 associated with the electronic device 110, and may also have a counter or clock for determining counter data, such as counter module 630 illustrated in FIG. 6 described below. It is further understood that server 130 may also know the unique identifier 124 and device identifier 127 associated with the electronic device 110 and may also have a counter or clock for determining counter data, such as counter module 730 illustrated in FIG. 7 described below.

At block 151, a user device may determine a hash function key 122. The hash function key 122 may be one type of electronic device data 111 associated with electronic device 110 and determined by the electronic device 110. Electronic device data 111 may also include authentication code 121, hash function key 122, counter data 123, unique identifier 124 (also referred to herein as a seed value), payload 125, encryption key 126, and device identifier 127, for example. At least some of electronic device data 111 (e.g., counter data 123, hash function key 122, authentication code 121, and/or encryption key 126) may be determined on a periodic basis as counter data 123 changes (e.g., with the passage of time). The purpose of determining the hash function key 122 is to determine an authentication code 121 that may be sent in signal 131, which is sent from electronic device 110. The authentication code 121 may be associated with signal 131 and may be used to identify signal 131. The hash function key 122 may be determined based on a unique identifier 124 (i.e., seed value) and/or device identifier 127. The unique identifier 124 may be generated during registration of the electronic device 110 (e.g., registering the device on a web-platform or application). For example, a user of electronic device 110 may register electronic device 110 on server 130. During the registration process, the unique identifier 124 may be generated and assigned to the electronic device 110 and associated with a user account. Device identifier 127 may be assigned to an electronic device and may be unique to electronic device 110. Unique identifier 124 and/or device identifier 127 may be or may include or be based on the MAC address or other data unique to the electronic device 110. Unique identifier 124 and/or device identifier 127 may be an alphanumeric value unique to electronic device 110. Counter data 123 may be any counter value. For example, counter data 123 may be a timestamp for 2:00 pm (i.e., 14:00).

The hash function key may be determined using a key derivation function (KDF). For example, the unique identifier 124 of electronic device 110 and device identifier 127 may be used as inputs and the key derivation function may generate a hash function key 122. In one example, the KDF may generate a hash function key that may be a hash-based message authentication code (HMAC) key.

At block 152, authentication code 121 may be determined using the hash function key and counter data. For example, the hash function key and counter data may be used to derive the authentication code. In the example where the hash function key 121 is an HMAC, an HMAC may be performed using the HMAC key and counter data to determine the authentication code 121. The counter data 123 in its entirety may be used as an input or may be truncated or otherwise simplified. For example, if the counter data 123 is a time stamp and the time is 14:23, the counter data 123 may be truncated to the hour. In this example, at the time of 14:23 the counter value would be 14:00. The electronic device 110 may be programed to round up or down depending on a threshold (e.g., round up at the half hour, depending on how frequently a new authentication code is desired for more granular or more course tracking). The authentication code 121 may be an alphanumeric value. To save memory and processing power, the authentication code 121 may be truncated or otherwise abbreviated. For example, the authentication code 121 used may be reduced to a certain number of digits and/or bits. In one example, the authentication code 121 may be reduced to 10 bytes. The authentication code may be an HMAC.

Electronic device 110 may optionally determine additional information to include in signal 131. For example, electronic device 110 may determine and/or generate a payload 125 (e.g., a message) to include in signal 131. The payload may be a bitstream or bytestream. In one example, the payload may be 14 bytes. Electronic device 110 may encrypt payload 125 using encryption key 126. Encryption key 126 may be determined using a KDF with the unique identifier 124 and counter data 123 used to determine the authentication code as inputs. For example, encryption key 126 may be a symmetric encryption key. In one example, the encryption key 126 may be an Advanced Encryption Standard (AES) symmetric encryption key. Alternatively, the payload may not be encrypted. It is understood that other portions of the signal 131 may also be encrypted such as product data or signal data.

At block 153, a signal 131 including at least the authentication code 121 may be sent by electronic device 110. In addition to the authentication code 121, the signal 131 may further include one or more of the following, signal data, product data, counter data, and/or a payload. The signal data may include a MAC address associated with the signal (e.g., randomized MAC address) as well as information about the type of signal being sent. The MAC address may periodically change. For example, a new randomized MAC address may be determined for each signal 131 generated and/or each time an authentication code is determined. In one example, signal data may include information about the intended recipient device of the signal such as the recipient's name, address, and/or identifier (collectively and individually referred to herein as address), and/or may include information about the purpose and/or type of the signal (e.g., may identify the signal as private). The signal may also include product data which may include information about the type or model of electronic device from which the signal originated. The signal may also include counter data corresponding to counter values determined and/or generated at the time the signal was generated by the electronic device 110. For example, if the signal is generated at 2:00 pm the electronic device 110 may determine a counter data 123 having a value of 14:00. It is understood that the type and/or size of the signal 131 may vary depending on the type of communication protocol used to send the signal (e.g., Bluetooth, BLE, Wi-Fi®, ZigBee, Near Field Communication, etc.). However, it is preferable that the signal 131 include at least an authentication code 121 and signal data.

Electronic device 110 may periodically send signal 131. Each time electronic device 110 sends a signal, the signal may use a counter data 123 corresponding to the counter value at that time (e.g., the time or counter value at the time the signal is sent). This may result in a rotating authentication code. As the authentication code may be dependent upon the counter data 123, the authentication code 121 may be unique to each signal sent. Electronic device 110 may periodically send the signal 131 at set time points. For example, electronic device 110 may send a signal every minute, every ten minutes, every half hour, every hour, etc. Alternatively, or additionally, electronic device 110 may send the signal upon the occurrence of a condition. For example, where electronic device 110 includes a sensor, a signal may be generated every time a certain output or result is generated by the sensor. In one example, where electronic device 110 involves an accelerometer, a signal may be generated every time electronic device 110 is moved, or that is moved in a manner to exceed a threshold as to distance, speed, etc. In yet another example, electronic device 110 may transmit a signal upon receiving a prompt from another device in communication with the electronic device 110 (e.g., a mobile device).

Alternatively, or in addition to, the electronic device 110 may send the signal 131 upon being prompted by another device to send the signal 131. For example, mobile device 140 may send a message to electronic device 110 instructing or otherwise prompting electronic device 110 to send the signal 131. In another example, the electronic device 140 may scan electronic device 110 or a portion thereof (e.g., may optically scan a QR code on the electronic device 110 or displayed by the electronic device 110) to determine certain information about the electronic device 110 (e.g., product data, payload, etc.). In this example, the electronic device 110 may passively provide the electronic device 140 information. The electronic device 140 may know the unique identifier of electronic device 110 and may maintain a counter such that counter data may be determined. Knowing the unique identifier of electronic device 110 and counter data, the electronic device 140 may determine the hash function key at block 151, determine the authentication code 152, and send the signal 131 at block 153. In yet another example, electronic device 140 may instead use its own unique identifier to determine the hash function key at block 151 and determine the authentication code 152.

The foregoing approach may be desirable for tracking the device as it is scanned by different electronic devices throughout the day. For example, the device may be scanned by various electronic devices 140 throughout the day. Based on the location of each electronic device 140 when the scan occurs, the location of the electronic device 110 may be inferred at different times. The electronic device may passively inform the electronic devices 140 of its unique identifier which may be associated with a user account number on a server. The electronic device may not know the user account number associated with the unique identifier but when signal 131 is sent to the server, the server may determine the corresponding user account number. In this manner, the server may track the location of the electronic device 110 associated with the user account number throughout the day.

Electronic device 110 may send the signal 131 via a wireless connection such as Bluetooth, BLE, Wi-Fi, ZigBee, Near Field Communication, or another suitable wireless connection protocol. For example, electronic device 110 may send the signal 131 using BLE and connected device 120 that are located within range of the BLE signal may receive signal 131. In one example, signal 131 may be a Bluetooth or BLE beacon that is periodically transmitted. BLE may be desirable where electronic device 110 frequently transmits signals as BLE may preserve battery power.

At block 154, connected device 120 may receive signal 131. Signal 131 may include information requesting that connected device 120 send all or part of signal 131 to server at a certain address. For example, the signal data may instruct connected device 120 to send signal 131 to server 130. Alternatively, or in addition to, connected device 120 may be programmed or otherwise known to send all or part of signal 131 to server 130. Accordingly, upon receiving signal 131, connected device 120 may send the signal 131 to server 130 via connection such as cable networks, public networks (e.g., the Internet), private networks (e.g., frame-relay networks), wireless networks, cellular networks, telephone networks (e.g., a public switched telephone network), or any other suitable private or public packet-switched or circuit-switched networks, or any combination thereof.

At block 155, server 130 may receive all or part of the signal 131. Upon receiving signal 131, server 130 may save the signal, or a portion thereof at server 130 or may cause the signal 131, or a portion thereof, to be saved elsewhere (e.g., on a database). At block 156, server 130 may determine (or have already determined) one or more authentication codes associated with the unique identifier (seed) 124 of the electronic device 110. It is understood that block 156 may occur before block 155 or any even before block 154, block 153, block 152, and/or block 151. Like electronic device 110, server 130 may know the unique identifier 124 and device identifier 127 assigned at registration to the electronic device 110.

Server 130 may maintain a table of registered electronic devices and their corresponding unique identifiers and device identifier. For each known unique identifier, server 130 may determine possible authentication codes based on different clock (counter) values. As explained above with respect to electronic device 110, an authentication code may be calculated using a hash function key, which may be determined using a KDF. For example, the unique identifier of electronic device 110 and device identifier may be used as inputs and the key derivation function may be used to determine a hash function key. As explained above, the KDF may generate a hash function key that may be a hash-based message authentication code (HMAC) key. The authentication code may be determined using the hash function key and counter data. In the example where the hash function key is an HMAC key, an HMAC may be performed using the HMAC key and counter data to determine the authentication code. The server 130 may use counter data corresponding to the current time or a known counter data to determine the authentication code. For example, the counter data may be unique and/or associated to an electronic device and different electronic devices may use different counter data. Also as explained above, the counter data may be truncated or otherwise simplified. The table may alternatively, or additionally, determine counter values near the current time or known counter data. For example, if the current time is 14:00 and the counter data is truncated to the hour, server 130 may also determine records for counter data values of 13:00 and 15:00.

In this manner, table 141 may be generated which may include a plurality of records having authentication codes with a corresponding unique identifier (i.e., seed value), device identifier, and counter data. As explained above, to save memory and processing power, the authentication code may be truncated or otherwise abbreviated. The authentication code may be truncated or abbreviated in the same manner used by electronic device 110. In addition, table 141 may optionally include known product data corresponding to the unique identifier. Table 141 may also optionally include a decryption key corresponding to each unique identifier. The decryption key may be determined in the same manner as the encryption key described above. Specifically, the decryption key may be determined using a KDF with the same unique identifier and counter data used to determine the authentication code as inputs. The decryption key may be a symmetric encryption key. In one example, the decryption key may be an Advanced Encryption Standard (AES) symmetric encryption key. Table 141 may also optionally include a user identification code or user account number associated with the unique identifier associated with the electronic device 110. For example, a user identification number may be associated with electronic device 110 at registration. It is understood that server 130 may maintain a separate table of user identification codes and seed values and may cross reference this separate table upon determining a matching authentication code. Alternatively, the separate table may be maintained on a separate device such as a datastore.

At block 157, server 130 may determine a match in table 141 to authentication code 121, or a truncated version of authentication code 121. Specifically, server 130 may find an authentication code in table 141 matching the value of authentication code 121 in signal 131, or a truncated portion thereof. The matching authentication code may correspond to matching record 142. Matching record 142 may be used to determine a unique identifier and/or product data corresponding to the electronic device 110 from which the signal 131 originated. Once a matching authentication code and corresponding record has been determined by server 130, server 130 may send information associated with signal 131 to a database to be saved on the database. The information may be associated to a device or user account corresponding to the unique identifier, and thus, electronic device 110. Alternatively, the information may be saved on sever 130.

Server 130 may periodically update table 141 with new records based on updated counter data. For example, every minute, ten minutes, hour, etc., new records may be generated by table 141 using the known unique identifiers. A history of records may be maintained by table 141. Older records may be periodically deleted to save space. Table 141 may be reduced to a subset of records to facilitate finding an authentication code having a value that matches authentication code 121 in signal 131 by reducing in size the set of optional authentication codes searched for a match. For example, signal 131 may include product data and/or counter data that may not be encrypted. The server may use the product data and/or counter data to determine a subset of records from table 141 corresponding to the product data and/or counter data. As is shown in FIG. 1, the subset of records may include only records having the same product data value and counter data value included in signal 131. As server 130 may maintain a table corresponding to a large number of electronic devices, reducing the table using these values, or other known values, may facilitate more efficient searching of a record having a matching authentication code.

At block 158, matching record 142 may further be used to determine a corresponding decryption key. If the payload received in signal 131 is encrypted, the decryption key corresponding to matching record 141 may be used to decrypt the payload. As explained above, the payload may include certain instructions. For example, instructions may instruct the server 130 to send a message to a second different electronic device, such as electronic device 140. Alternatively, the instructions may instruct server 130 to update (or generate) a table populated with matched records and other information associated with the electronic device 110 (e.g., corresponding to the location of the electronic device 110 throughout the day) or otherwise take another action or perform a task or operation.

At block 159, the server 130 may determine to take an action, which action may be based on the payload. For example, server 130 may decrypt the payload and determine to take action based on an instruction(s) in the decrypted payload. For example, the instructions may instruct server 130 to inform electronic device 140, which may be a mobile device associated with the electronic device 110 or a user account with which electronic device 110 is associated, that electronic device 110 has arrived. Server may know information about connected device 120, such as the location of connected device 120. Alternatively, this information may be included in the signal received by server 130. The location information may be used when taking action or otherwise performing a task or operation. For example, server 130 may inform electronic device 140 that electronic device 110 arrived at the location of connected device 120.

Embodiments of the disclosure may improve computing efficiency and bandwidth by reducing a number of actions and calculations that need to be performed to initiate certain tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
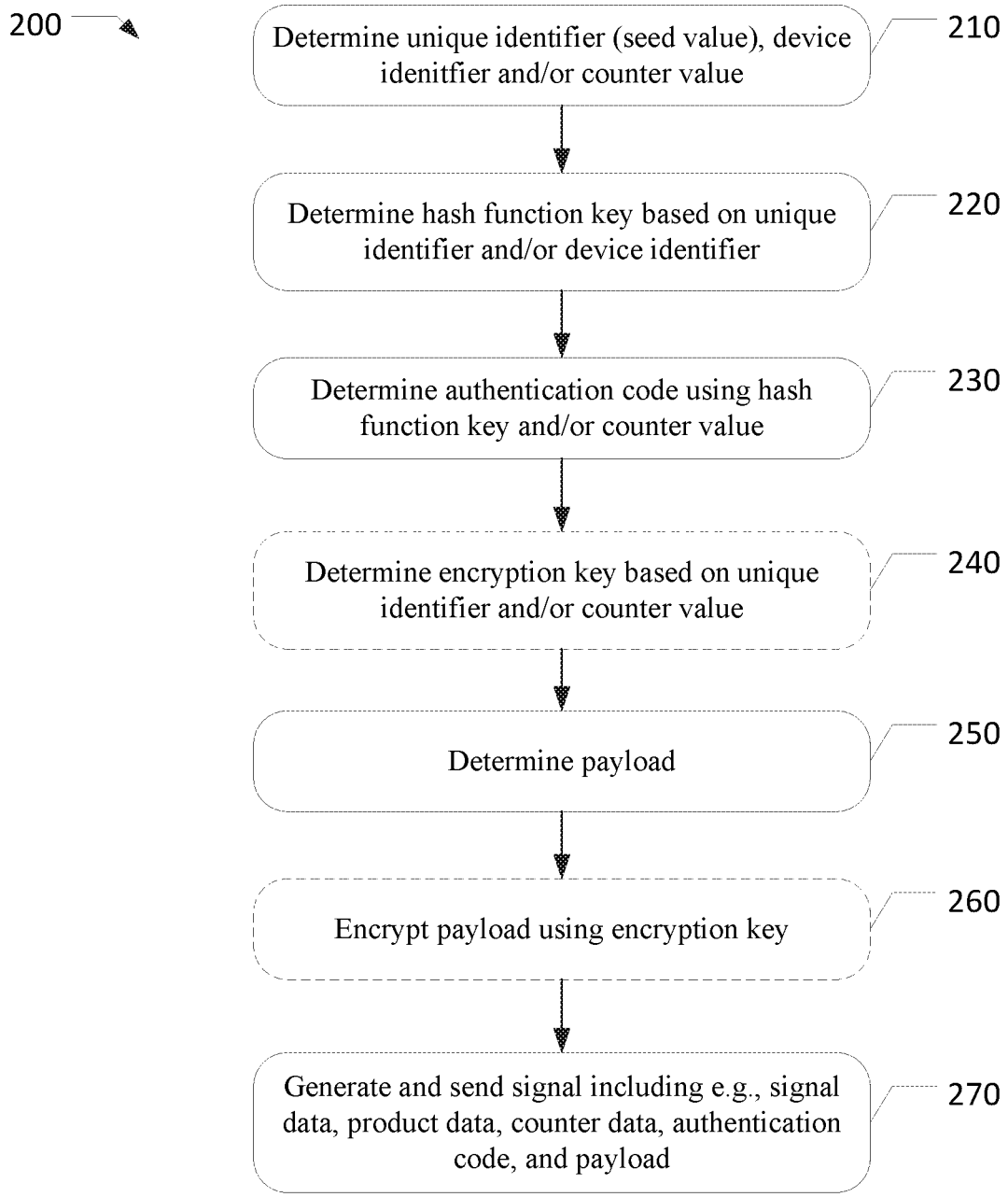
FIG. 2 is a schematic illustration of an example process flow for sending signals including an authentication code from an electronic device to one or more connected devices in accordance with one or more example embodiments of the disclosure.

FIG. 2 depicts an example process flow 200 for generating a signal at electronic device 110 and sending a signal by electronic device 110 via a wireless connection such as Bluetooth, BLE, Wi-Fi, ZigBee, Near Field Communication, or another suitable wireless connection protocol.

While example embodiments of the disclosure may be described in the context of electronic devices, it should be appreciated that the disclosure is more broadly applicable to various types of mobile or wearable devices as well as devices such as smart-sensors and the like. Some or all of the blocks of the process flows in this disclosure may be performed in a distributed manner across any number of devices. The operations of the process flow 200 may be optional and may be performed in a different order.

At block 210, computer-executable instructions stored on a memory of a device, such as an electronic device, may be executed to determine a unique identifier and/or a counter data. As explained above, the unique identifier may be assigned to the electronic device at registration and may be unique to that electronic device. The device identifier may also be unique to the electronic device. The electronic device may know the unique identifier and unique identifier. As also explained above, counter data may correspond to counter values and/or time values (e.g., time stamps). The electronic device may be programmed to maintain counter data and may receive updated instructions from a server regarding maintaining counter data (e.g., to synchronize counter data with a server). The computer executable code executed at block 210 may be counter module 630.

At block 220, computer-executable instructions stored on a memory of a device, such as an electronic device, may be executed to determine a hash function key based on the unique identifier and/or the device identifier. As explained above, the hash function key may be determined using a KDF. For example, the unique identifier of electronic device and device identifier may be used as inputs and the KDF may generate a hash function key. In one example, the KDF may generate a hash function key that may be a hash-based message authentication code (HMAC) key. The hash function key may be based on the counter data, which may be truncated or otherwise simplified. The computer executable code executed at block 220 may be hash function module 631.

At block 230, computer-executable instructions stored on a memory of a device, such as an electronic device, may be executed to determine an authentication code using the hash function key and counter data. As explained above, the hash function key and counter data may be used to derive the authentication code. In the example where the hash function key is an HMAC key, an HMAC may be performed using the HMAC key and counter data to determine the authentication code. As also explained above, to save memory and processing power, the counter data and/or authentication code may be truncated or otherwise abbreviated. For example, the authentication code may be reduced to a certain amount of digits and/or bits. Truncation may not be desired where the electronic device infrequently generates and sends signals. However, where signals are frequently generated and sent, truncation may be desirable to save memory. The computer executable code executed at block 230 may be counter module 730 and/or authentication code module 633.

At optional block 240, computer-executable instructions stored on a memory of a device, such as an electronic device, may be executed to determine an encryption key based on the unique identifier and/or counter data. As explained above, the encryption key may be determined using a KDF with the unique identifier and counter data as inputs. The encryption key may be a symmetric encryption key such as an AES symmetric encryption key. The computer executable code executed at optional block 240 may be encryption module 632.

At block 250, computer-executable instructions stored on a memory of a device, such as an electronic device, may be executed to encrypt a payload. As explained above, an electronic device may determine and/or generate a payload (e.g., message) to include in signal such as a bitstream or bytestream. The payload may include instructions to perform an action, task or operation. As shown in FIG. 1, the payload may inform a server to send a message to a mobile device. At optional block 260, computer-executable instructions stored on a memory of a device, such as an electronic device, may be executed to encrypt the payload using encryption key. Alternatively, the payload may not be encrypted. The computer executable code executed at blocks 250 and 260 may be encryption module 632.

At block 270, a signal may be generated and sent by the electronic device. In one example, the signal may involve the authentication code as well as signal data, counter data, product data, and the payload. The electronic device may generate byte streams with the foregoing information and encode a signal with the byte streams. For example, the signal may involve 2 bytes of signal data, 2 bytes of product data, 4 bytes of counter data, 10 bytes of authentication code and 14 bytes of payload. It is understood that the signal may include additional information. The signal may be sent and/or transmitted by the electronic device. For example, the signal may be sent or transmitted using transceiver 612 and/or antenna 634 as described below with respect to FIG. 6. The signal may be sent via a well-known wireless connection such as Bluetooth, BLE, Wi-Fi, ZigBee, Near Field Communication, or another suitable wireless connection protocol.

Figure 3:
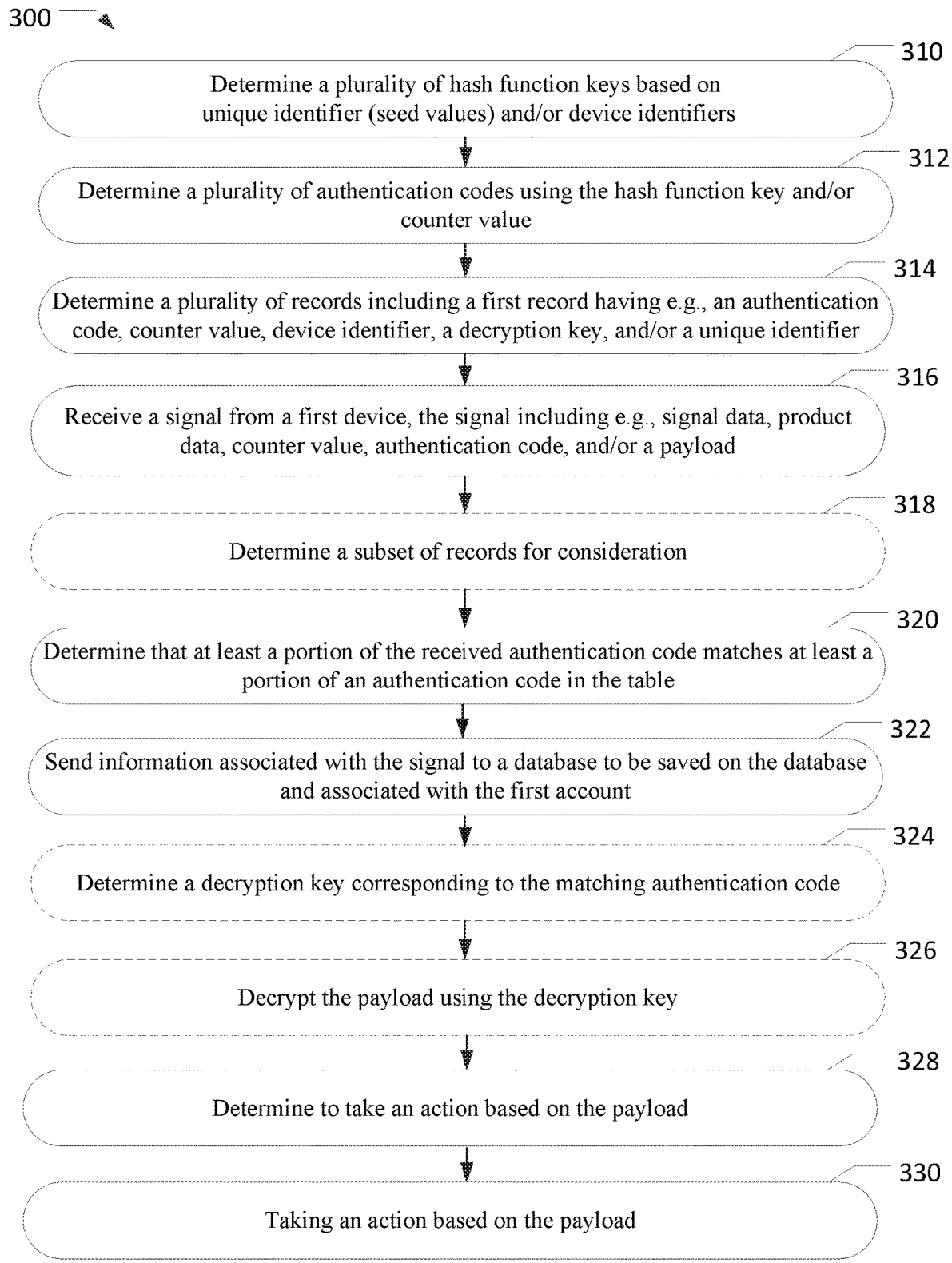
FIG. 3 is a schematic illustration of an example use case for determining a plurality of records including authentication codes and receiving a signal including an authentication code in accordance with one or more example embodiments of the disclosure.

FIG. 3 depicts an example process flow 300 for generating and receiving a signal at one or more servers and matching an authentication code in the signal to an authentication code in a table maintained by the server. It should be appreciated that some or all of the blocks of the process flows in this disclosure may be performed in a distributed manner across any number of servers and/or computing devices. The operations of the process flow 300 may be optional and may be performed in a different order.

At block 310, computer-executable instructions stored on a memory of a device, such as a server, may be executed to determine a plurality of hash function keys. The hash function keys may be based on unique identifiers and device identifiers. As explained above, the unique identifiers may be assigned to electronic devices at registration and may be unique to an electronic device. The device identifier may also be unique to the electronic device. The hash function keys may be determined by the server using KDFs. For example, a unique identifier and device identifier may be used as inputs and the KDF may generate a hash function key. In one example, the KDF may generate a hash function key that may be a hash-based message authentication code (HMAC) key. The computer executable code executed at block 310 may be hash function module 731.

At block 312, computer-executable instructions stored on a memory of a device, such as a server, may be executed to determine a plurality of authentication codes using the plurality of hash function keys. As explained above, a hash function key and counter data may be used to derive an authentication code and/or an authentication code may be based on a hash function key and counter data. Also explained above, counter data may correspond to counter values and/or time values (e.g., time stamps) on respective electronic devices. In the example where a hash function key is an HMAC, an HMAC may be performed using the HMAC key and counter data to determine the authentication code. As also explained above, to save memory and processing power, the authentication code may be truncated or otherwise abbreviated. The server and the electronic device may coordinate such that the electronic device and the server truncate the authentication code in the same manner. An authentication code may be determined for each known unique identifier at a plurality of counter data. An authentication code may be determined for each hash function key determined. The computer executable code executed at block 312 may be authentication code module 733.

At block 314, computer-executable instructions stored on a memory of a device, such as a server, may be executed to determine a plurality of records. A server may determine and maintain the plurality of records. The plurality of records may be based on known unique identifiers and device identifiers corresponding to registered devices. The server, may use counter data corresponding to the current time or a known counter value and a unique identifier to populate a record. Additional records may be based on counter data similar to the current time or a known counter value. The records may include the authentication code, unique identifier, device identifier, counter data, product data if known, and other information such as a decryption key. The server may periodically generate additional records by modifying the counter data. The computer executable code executed at block 314 may be communication module 728.

At block 316, computer-executable instructions stored on a memory of a device, such as a server, may be executed to receive a signal from a connected device. The received signal may include an authentication code as well as signal data, product data, counter data, and/or a payload. The signal may be optionally saved by the server or may be saved on a different device. Upon receiving the signal, the server may identify an authentication code in the signal. The computer executable code executed at block 316 may be decryption module 732.

At optional block 318, computer-executable instructions stored on a memory of a device, such as a server, may be executed to determine a subset of records for consideration. The subset of records may be a reduced number of records of the plurality of records. For example, as explained above, the plurality of records may be reduced based on the counter data in the received signal and/or the product data. It may be desirable to determine a subset of records for consideration to facilitate the process of searching and matching authentication codes at block 320. The computer executable code executed at optional block 318 may be database module 735.

At block 320, computer-executable instructions stored on a memory of a device, such as a server, may be executed to determine that at least a portion of the authentication code in the received signal matches at least a portion of an authentication code in a table including the plurality of records. Specifically, the server may find an authentication code in the table of the plurality of records that matches the value of authentication code in signal. Alternatively, the received signal may only include a truncated or abbreviated version of the authentication code and the server may find the truncated or abbreviated version of the authentication code in the table of the plurality of records. The matching authentication code, or portion thereof, may correspond to a matching record that may include one or more of a corresponding unique identifier, device identifier, product data, hash function key, and/or decryption key. From the matching record corresponding to the matching authentication code, or portion thereof, the server may determine a unique identifier and/or product data from the electronic device from which the signal originated. The computer executable code executed at block 320 may be database module 735.

At block 322, computer-executable instructions stored on a memory of a device, such as a server, may be executed to send information associated with the signal to a database to be saved on the database and associated with an account corresponding to the unique identifier upon determining that at least a portion of the authentication code in the received signal matches at least a portion of an authentication code in a table including the plurality of records. The information associated with the signal may be any information included in the signal and/or information corresponding to the signal. Alternatively, the information may be saved on the server. The computer executable code executed at block 322 may be database module 735.

At optional block 324, computer-executable instructions stored on a memory of a device, such as a server, may be executed to determine a decryption key corresponding to the authentication code. As explained above, the decryption key may be determined using a KDF with the same counter data and device identifier used to determine the authentication code. The decryption key may be a symmetric encryption key such as an AES symmetric encryption key. Block 324 may alternatively occur simultaneously with block 314 when determining the plurality of records. The computer executable code executed at block 324 may be encryption module 732.

At optional block 326, computer-executable instructions stored on a memory of a device, such as a server, may be executed to decrypt the payload using the decryption key. For example, the server may determine the payload in the signal and may apply the decryption key to the payload. By decrypting the payload the server may read the instructions and/or message in the payload. Alternatively, the payload may not be encrypted and thus a decryption key may not be necessary. The computer executable code executed at block 326 may be decryption module 732.

At block 328, computer-executable instructions stored on a memory of a device, such as a server, may be executed to determine whether to take an action or perform a task or operation based on the payload. For example, the instructions in the payload may instruct server to inform a certain mobile device that the electronic device from which the signal originated has arrived at a location. The server may know information about the connected device such as its location and may assume that the electronic device was at the location of the connected device due to the relatively short range of the nearfield communication in the signal data. The server may use this information to determine whether to take an action or otherwise perform a task or operation. The computer executable code executed at block 328 may be implementation module 736.

At block 330, computer-executable instructions stored on a memory of a device, such as a server, may be executed to take an action or otherwise perform a task or operation. For example, upon decrypting a payload, the server may determine, based on the payload, to send a message to a mobile device and inform the mobile device that the electronic device has arrived at a location. For example, a mother may receive a message on her mobile device stating the smartwatch of her child arrived home at a certain time. In another example, the instructions may cause the server to maintain a table of received signals which may include the time that the signal was received and the location of the connected device that sent the signal to the server. A second electronic device may be used to access the table to view the location of the device at the corresponding time points. This may be used by an administrator of a delivery company to track deliveries throughout the day.

Figure 4:
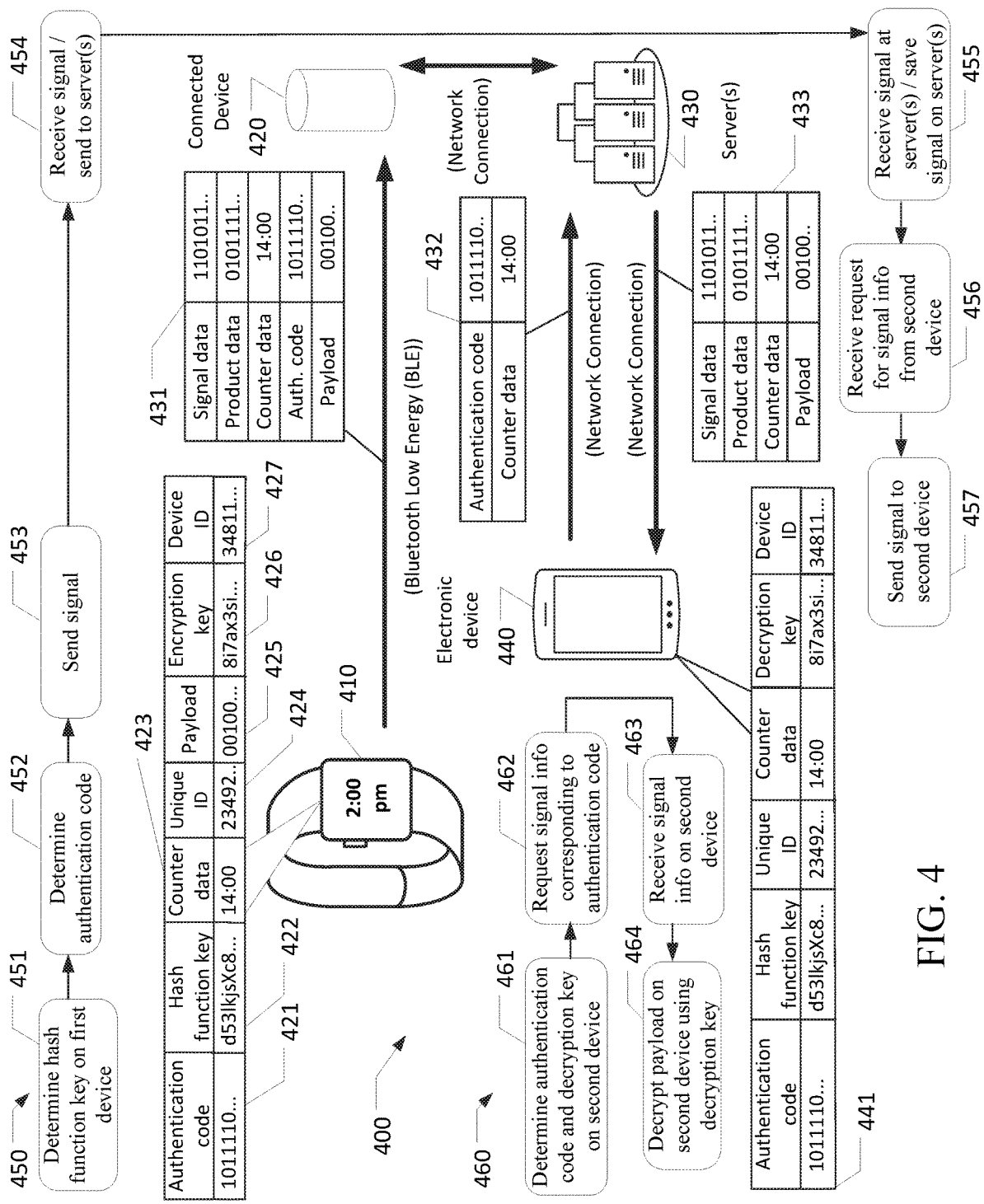
FIG. 4 is a schematic illustration of an example use case for receiving signal information from one or more servers in accordance with one or more example embodiments of the disclosure.

FIG. 4 is a schematic illustration of an example use case 400 for requesting signal information corresponding to an authentication code from a server and receiving the signal information from the server is depicted in accordance with one or more example embodiments of the disclosure. In the illustrated example, electronic device 410 may be the same as electronic device 110, connected device 420 may be the same as connected device 120, electronic device 440 may be the same as electronic device 140, and server 430 may be the same or substantially similar to server 130 except that server 430 may not know the unique identifier of the electronic device from which the signal originates.

Similar to user case 100, connected device 420 may communicate with electronic device 410 via one or more networks and may also communicate with server 430 via one or more networks. Additionally, server 430 may communicate with electronic device 440 via one or more networks. It is understood that these networks may be the same, or different from one another. For example, electronic device 410 may communicate with connected device 420 via BLE. Additionally, connected device 420 may communicate with server 430 over the Internet via WIFI. Also, server 430 may communicate with electronic device 140 via a cellular network.

To initiate the actions of determining and sending a signal to a server and receiving the signal by the server and sending that signal to a second electronic device, an example process flow 450 is presented and may be performed, for example, by one or more modules at electronic device 410, connected device 420, server 430, and/or electronic device 440. The electronic device 410, connected device 420, server 430, and/or electronic device 440 may include at least one memory that stores computer-executable instructions and at least one processor configured to access the at least one memory and execute the computer-executable instructions to perform various actions or operations, such as one or more of the operations in the process flow 450 of FIG. 4. It is understood that electronic device 410 may know a unique identifier 424 (i.e., seed value) and device identifier 427 of the electronic device 410 and may also have a counter or clock for determining counter data 423, such as counter module 630 illustrated in FIG. 6 described below.

Block 451, block 452, block 453, and block 454 of process flow 450 may be the same as block 151, block 152, block 153, and block 154 of process flow 150, described above with respect to FIG. 1. Further, authentication code 421, hash function key 422, counter data 423, unique identifier 424, payload 425, encryption key 426, and device identifier 427 may be the same as authentication code 121, hash function key 122, counter data 123, unique identifier 124, payload 125, encryption key 126, and device identifier 127, respectively. Additionally, the signal 431 generated and sent by electronic device 410 may be the same as the signal 131 generated and sent by electronic device 110. Specifically, the signal data, product data, counter data, authentication code, and payload may be the same in signal 431 as signal 131.

At block 454, as explained above with respect to connected device 120 of FIG. 1, connected device 420 may receive signal 431 and send signal 431 to server 430. At block 455, server 430 may receive signal 431. Upon receiving signal 431, server 130 may save the signal, or a portion thereof, to server 430 or may cause the signal 131, or a portion thereof, to be saved elsewhere (e.g., on a database). Server 430 may generate a table of signals, with each signal associated to an authentication code included in that signal. The table may be searchable according to the authentication code. The table may also include non-encrypted information in the signal (e.g., product data or counter data).

At block 456, server 430 may receive a message 432 from a second electronic device, electronic device 440. Message 432 may request signal information from server 430. The electronic device 440 may communicate with the server 430 via a wireless connection such as Bluetooth, BLE, Wi-Fi, ZigBee, Near Field Communication, or another suitable wireless connection protocol. The message 432 may include an authentication code and optionally other information (e.g., counter data, product data, etc.). The message may request signal information regarding a signal corresponding to that authentication code. Upon receiving the message 432, server 430 may identify a signal corresponding to the authentication code in the message 432. Specifically, the server 430 may use a table of received signals to match a received authentication code, or a truncated or abbreviated portion thereof, to a saved signal. The server 430 may use other information in the message 432 (e.g., counter data) to determine a subset table to more efficiently search for matching authentication codes.

At block 457, upon matching a received authentication code, or a truncated or abbreviated portion thereof, to an authentication code in the table, or a truncated or abbreviated portion thereof, and thus identifying a received signal corresponding to the authentication code, server 430 may send information corresponding to the signal to the electronic device 410. The information corresponding to the signal may be the signal itself or a portion of the signal such as the payload, signal data, and/or product data. Message 433 sent from server 430 to mobile device 440 may include signal information such as signal data, product data, counter data, and/or the payload associated with the signal corresponding to the authentication code. Upon determining a matching authentication code or portion thereof, the server 430 may make a record that electronic device 440 requested the signal information matching an authentication code corresponding to a signal received by server 430.

To initiate the actions of determining an authentication code and requesting and receiving signal information on electronic device 440, an example process flow 460 is presented and may be performed, for example, by one or more modules at electronic device 440. At block 461, electronic device 440 may determine an authentication code and a decryption key corresponding to a unique identifier, device identifier and/or counter data. For example, electronic device 440 may know an electronic device that it would like to request signal information about and may know the unique identifier of the electronic device (e.g., electronic device 410). The electronic device 440 may want to know about a signal sent at a certain time or counter value and thus may also know the counter data.

With the known unique identifier and counter data, electronic device 440 may determine an authentication code in the same manner that electronic device 410 determines an authentication code, described above with respect to step 451. Similarly, electronic device 440 may determine a decryption key in the same manner that electronic device 410 determines an encryption key. As the encryption key and the decryption are symmetric, the encryption key may be the same as the decryption key, described above with respect to process flow 450. Using the known unique identifier and counter data, electronic device 440 may determine record 441 for the known authentication code. Record 441 may include the authentication code and one or more corresponding hash function keys, unique identifiers (i.e., seed values), device identifier counter data, and/or encryption key.

At block 462, electronic device 440 may request from server 430 signal information corresponding to the authentication code determined. Specifically, electronic device 440 may send server 430 the message 432 which may include the authentication code and optionally counter data. At block 463, electronic device 440 may receive the requested signal information from the server 430. For example, electronic device 440 may receive message 433, which may include signal information. As explained above, the server 430 may determine signal information corresponding to the requested authentication code and may send that information to electronic device 440.

At optional block 464, electronic device 440 may determine the payload in the signal information received in message 433 and may decrypt the payload using the decryption key determined at block 461. Alternatively, the decryption key may be determined at optional block 464 upon receiving message 433 and determining the payload. As the payload may not be encrypted, it may not be necessary to determine the decryption key. Upon decrypting the payload, the electronic device 440 may determine whether to take an action based on the payload and may take an action based on the payload. For example, the electronic device 440 may populate a table saved on electronic device 440 using information included in the payload and/or other signal information.

Figure 5:
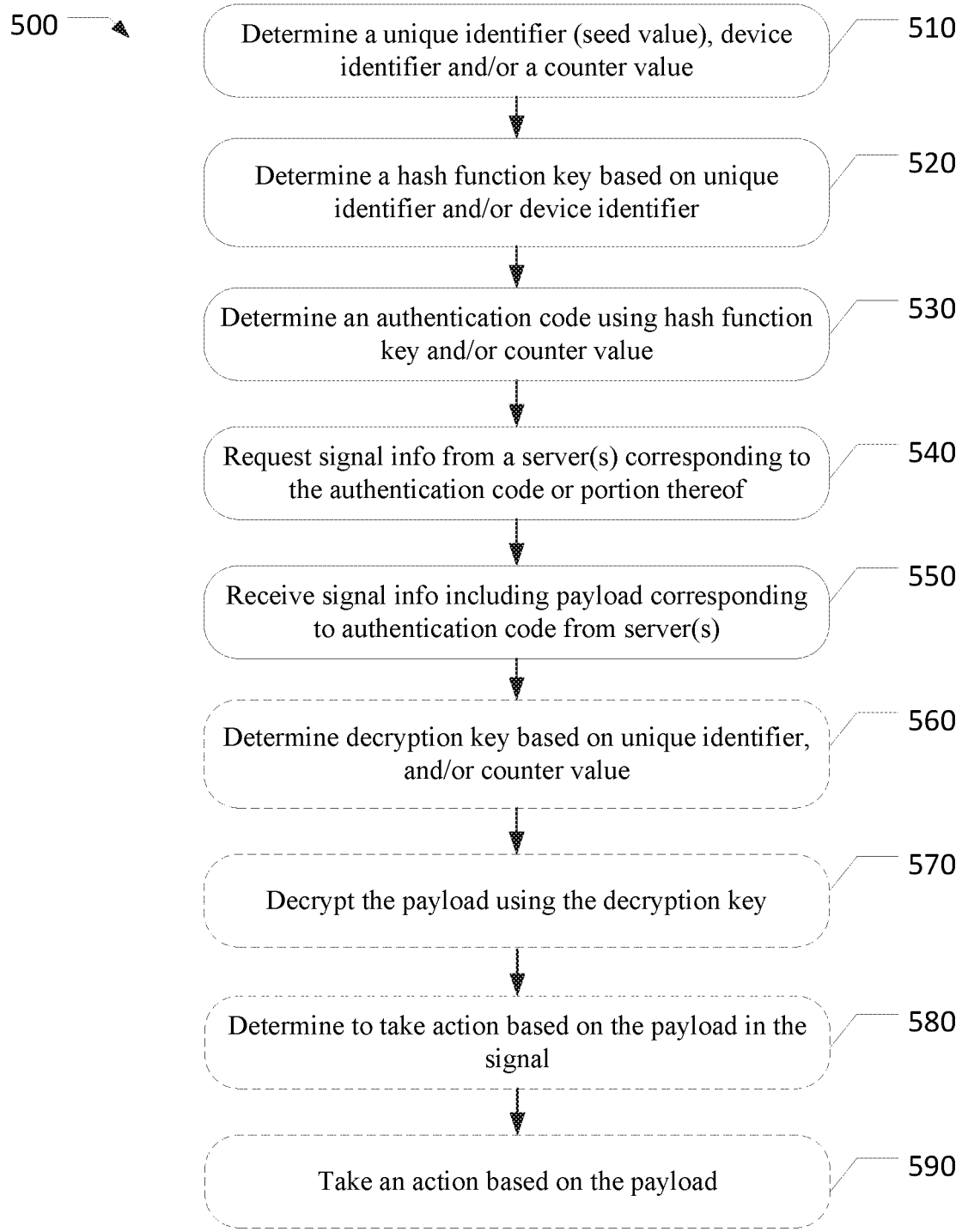
FIG. 5 is a schematic illustration of an example process flow for requesting a signal corresponding to an authentication code from a server in accordance with one or more example embodiments of the disclosure.

FIG. 5 depicts an example process flow 500 for generating a message, including a request for signal information at an electronic device and sending the request by the electronic device to the server via a wireless connection such as Bluetooth, BLE, Wi-Fi, ZigBee, Near Field Communication, or another suitable wireless connection protocol. While example embodiments of the disclosure may be described in the context of electronic devices, it should be appreciated that the disclosure is more broadly applicable to various types of mobile or wearable devices. Some or all of the blocks of the process flows in this disclosure may be performed in a distributed manner across any number of devices. The operations of the process flow 500 may be optional and may be performed in a different order.

At block 510, computer-executable instructions stored on a memory of a device, such as an electronic device, may be executed to determine a unique identifier, device identifier, and/or a counter data. Block 510 may be the same or substantially similar to block 210 of FIG. 2. As explained above, the unique identifier and/or device identifier may correspond to a different electronic device. At block 520, computer-executable instructions stored on a memory of a device, such as the electronic device, may be executed to determine a hash function key based on the unique identifier and/or the device identifier. Block 520 may be the same or substantially similar to block 220 of FIG. 2. At block 530, computer-executable instructions stored on a memory of a device, such as the electronic device, may be executed to determine an authentication code using the hash function key and counter data. Block 530 may be the same or substantially similar to block 230 of FIG. 2.

At block 540, computer-executable instructions stored on a memory of a device, such as the electronic device, may be executed to send a message to the server, the message including a request for information about a signal. For example, transceiver 612 and antenna 634 may be used by the electronic device to send a message (e.g., via Wi-Fi or cellular). The message may identify the authentication code determined at block 530 and may request signal information about the signal corresponding to that authentication code. Alternatively, the electronic device may request signal information about a signal corresponding to a truncated or abbreviated authentication code. The message may include additional information such as product data and/or counter data. The computer executable code executed at block 540 may be encryption module 632.

At block 550, computer-executable instructions stored on a memory of a device, such as the electronic device, may be executed to receive a message from a server including signal information. For example, transceiver 612 and antenna 634 may be used by the electronic device to receive a message (e.g., via Wi-Fi or cellular). The received message may include signal information such as some or all of the signal corresponding to the authentication code or information corresponding thereto. For example, signal information may include signal data, product data, counter data and/or the payload corresponding to the signal. Upon receiving the message including signal information, the electronic device may save some or all of the signal information to the electronic device or may cause a second device to save some or all of the signal information. The computer executable code executed at block 550 may be communication module 628.

At optional block 560, computer-executable instructions stored on a memory of a device, such as the electronic device, may be executed to determine a decryption key based on the unique identifier and/or the counter data used to determine the authentication code at block 530. Block 560 may be the same or substantially similar to block 240 of FIG. 2. The encryption key determined at block 240 of FIG. 2 and the decryption key determined at block 560 may be a symmetric encryption key and thus may be the same. Alternatively, the decryption key may be determined at the same time the authentication code is determined at block 530. At optional block 570, computer-executable instructions stored on a memory of a device, such as the electronic device, may be executed to decrypt a payload. The payload may be decrypted using the decryption key. Alternatively, the payload may not be encrypted and thus a decryption may not need to be determined and the payload need not be decrypted. The computer executable code executed at block 560 and block 570 may be encryption module 632.

At optional block 580, computer-executable instructions stored on a memory of a device, such as the electronic device, may be executed to determine whether to take an action or perform a task or operation based on the payload. For example, the payload may include instructions to populate a table with some or all of the signal information. At optional block 590, computer-executable instructions stored on a memory of a device, such as the electronic device, may be executed to take an action or otherwise perform a task or operation based on the payload. For example, the electronic device may determine to populate a table with some or all of the signal information. The computer executable code executed at block 580 and block 590 may be implementation module 636.

Illustrative Device Architecture

Figure 6:
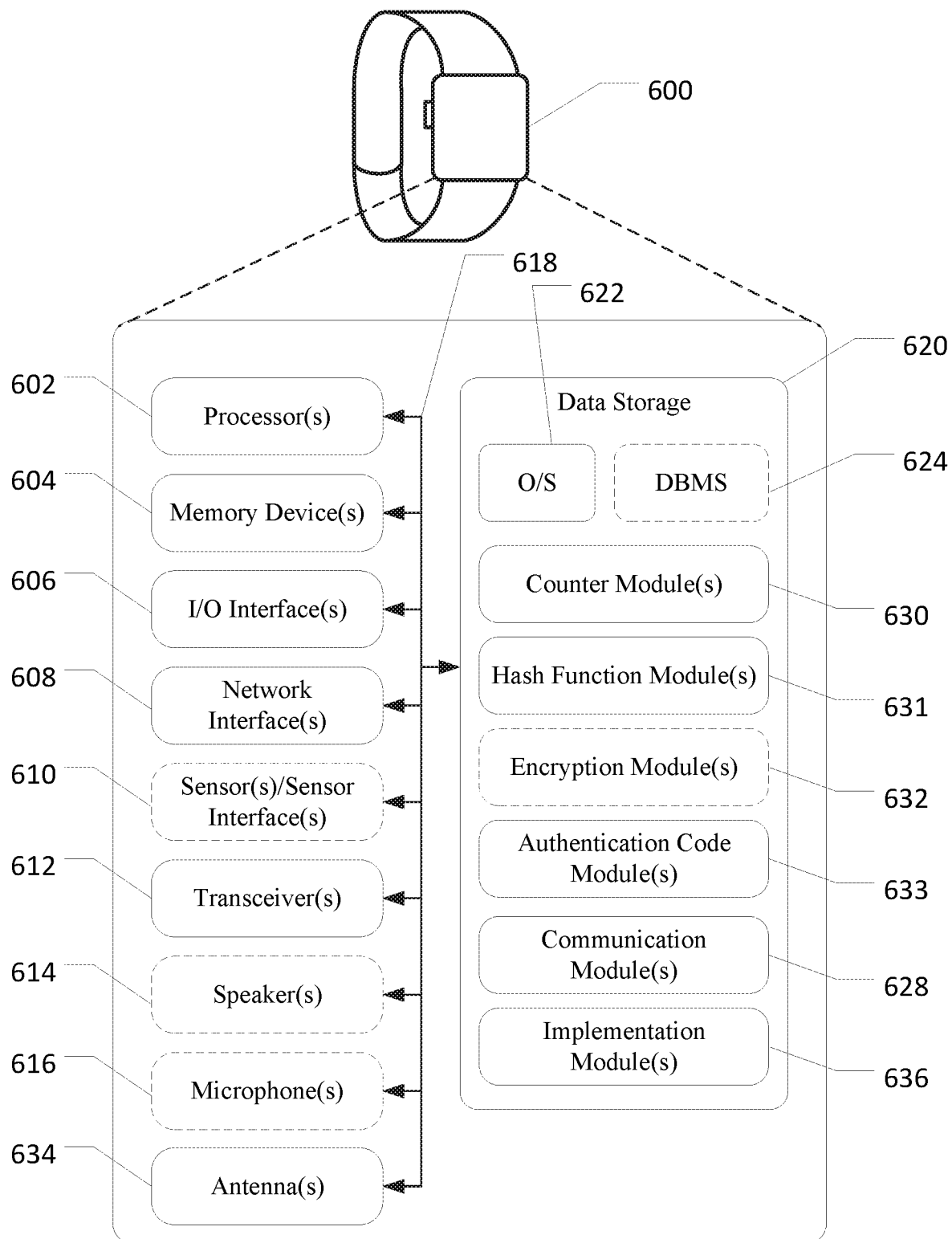
FIG. 6 is a schematic block diagram of an illustrative electronic device in accordance with one or more example embodiments of the disclosure.

FIG. 6 is a schematic block diagram of an illustrative electronic device 600 in accordance with one or more example embodiments of the disclosure. The electronic device 600 may include any suitable computing device capable of receiving and/or sending data, and may optionally be coupled to devices including, but not limited to, an electronic device such as a smartphone, tablet, e-reader, mobile device, wearable device, or the like; a connected device; a desktop computer; a laptop computer; a content streaming device; a set-top box; one or more servers; or the like. The electronic device 600 may correspond to an illustrative device configuration for electronic device 110, electronic device 140, electronic device 410, electronic device 440, connected device 120, connected device 420, and any other electronic devices of FIGS. 1-5.

The electronic device 600 may be configured to communicate via one or more networks with one or more servers, search engines, user devices, connected device, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 600 may include one or more processors (processor(s)) 602, one or more memory device(s) 604 (generically referred to herein as memory 604), one or more input/output (I/O) interface(s) 606, one or more network interface(s) 608, one or more optional sensors or sensor interface(s) 610, one or more transceiver(s) 612, one or more optional speaker(s) 614, one or more optional microphone(s) 616, one or more antenna(s) 634, and data storage 620. The electronic device 600 may further include one or more bus(es) 618 that functionally couple various components of the electronic device 600. The electronic device 600 may further include one or more antenna(e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the electronic device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the electronic device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more counter module(s) 630, one or more hash function module(s) 631, one or more encryption module(s) 632, one or more authentication code module(s) 633, one or more communication module(s) 628, and/or one or more implementation module(s) 636. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the electronic device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the electronic device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the counter module(s) 630 may include computer-executable instructions, code, or the like that are responsive to execution by one or more of the processor(s) 602 may perform functions including, but not limited to, maintaining a count which may or may not correspond to temporal information. In one example, the counter module(s) 630 may be programmed to start at a certain value and may be incrementally increased or decreased. In another example, the count may correspond to time, which may or may not be synchronized with the time in the location in which electronic device 600 is located. Counter module(s) 630 may be periodically synchronized with counter module(s) 730(s) of server 700 of FIG. 7 such that counter module(s) 630 and counter module(s) 730 determine or generate the counter values.

The hash function module(s) 631 may include computer-executable instructions, code, or the like that are responsive to execution by one or more of the processor(s) 602 may perform functions including, but not limited to, determining a hash function key. The hash function module(s) 631 may determine a hash function key based on a unique identifier (i.e., seed value) and/or a device identifier. For example, the hash function key may be determined using a KDF. The unique identifier of the electronic device 600 and device identifier may be used as inputs. In one example, the KDF may generate a hash function key that may be a hash-based message authentication code (HMAC) key.

The optional encryption module(s) 632 may include computer-executable instructions, code, or the like that are responsive to execution by one or more of the processor(s) 602 may perform functions including, but not limited to, determining an encryption and/or decryption key and encrypting and/or decrypting a payload and/or other signal information. Encryption module(s) 632 may determine an encryption key and/or a decryption key using a KDF with the unique identifier and counter data as inputs. As explained above, the encryption and decryption keys may be symmetric. Encryption module(s) 632 may use the encryption key to encrypt the payload or decrypt the payload.

The authentication code module(s) 633 may include computer-executable instructions, code, or the like are that responsive to execution by one or more of the processor(s) 602 may perform functions including, but not limited to, determining an authentication code. The authentication code module(s) 633 may determine an authentication code using the hash function key and counter data (e.g., counter values). For example, the hash function key and counter data may be used to derive the authentication code and/or the authentication code may be based on the hash function key and counter data. The counter data may be truncated or otherwise abbreviated. In the example where the hash function key is an HMAC key, an HMAC may be performed using the HMAC key and counter data to determine the authentication code. The authentication code may be an HMAC. To save memory and processing power, the authentication code 121 may be truncated or otherwise abbreviated.

The communication module(s) 628 may include computer-executable instructions, code, or the like that are responsive to execution by one or more of the processor(s) 602 may perform functions including, but not limited to, communicating with one or more devices, for example, via wired or wireless communication, communicating with user devices, communicating with servers (e.g., remote servers), communicating with remote datastores and/or databases, sending or receiving notifications or commands/directives, communicating with cache memory data, communicating with user devices, and the like.

The implementation module(s) 632 may include computer-executable instructions, code, or the like that are responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining user devices associated with a user account, sending signals to user devices, electronic devices, other computing devices, servers, datastores and the like, initiating commands locally or at remote devices, and the like.

Referring now to other illustrative components depicted as being stored in the data storage 620, the O/S 622 may be loaded from the data storage 620 into the memory 604 and may provide an interface between other application software executing on the electronic device 600 and hardware resources of the electronic device 600. More specifically, the O/S 622 may include a set of computer-executable instructions for managing hardware resources of the electronic device 600 and for providing common services to other application programs (e.g., managing memory allocation among various application programs). In certain example embodiments, the O/S 622 may control execution of the other program module(s) for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device 600 is a mobile electronic device, the DBMS 624 may be any suitable light-weight DBMS optimized for performance on a mobile device.

Referring now to other illustrative components of the electronic device 600, the optional input/output (I/O) interface(s) 606 may facilitate the receipt of input information by the electronic device 600 from one or more I/O devices as well as the output of information from the electronic device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The electronic device 600 may further include one or more network interface(s) 608 via which the electronic device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for in cooperation with the antenna(e) 634—transmitting or receiving radio frequency (RF) signals in the bandwidth and/or channels corresponding to the communications protocols utilized by the electronic device 600 to communicate with other devices. The transceiver(s) 612 may include hardware, software, and/or firmware for modulating, transmitting, or receiving potentially in cooperation with any of antenna(e) 634 communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device 600. The transceiver(s) 612 may further include a low noise amplifier (LNA), additional signal amplifiers, an analog-to-digital (A/D) converter, one or more buffers, a digital baseband, or the like.

The optional sensor(s)/sensor interface(s) 610 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 610 may additionally, or alternatively, include health related sensors such as electrocardiogram (ECG) sensors, glucose sensors, heartrate sensors, temperature sensors, and the like. The optional speaker(s) 614 may be any device configured to generate audible sound. The optional microphone(s) 616 may be any device configured to receive analog sound input or voice data, and may include noise cancellation functionality.

Figure 7:
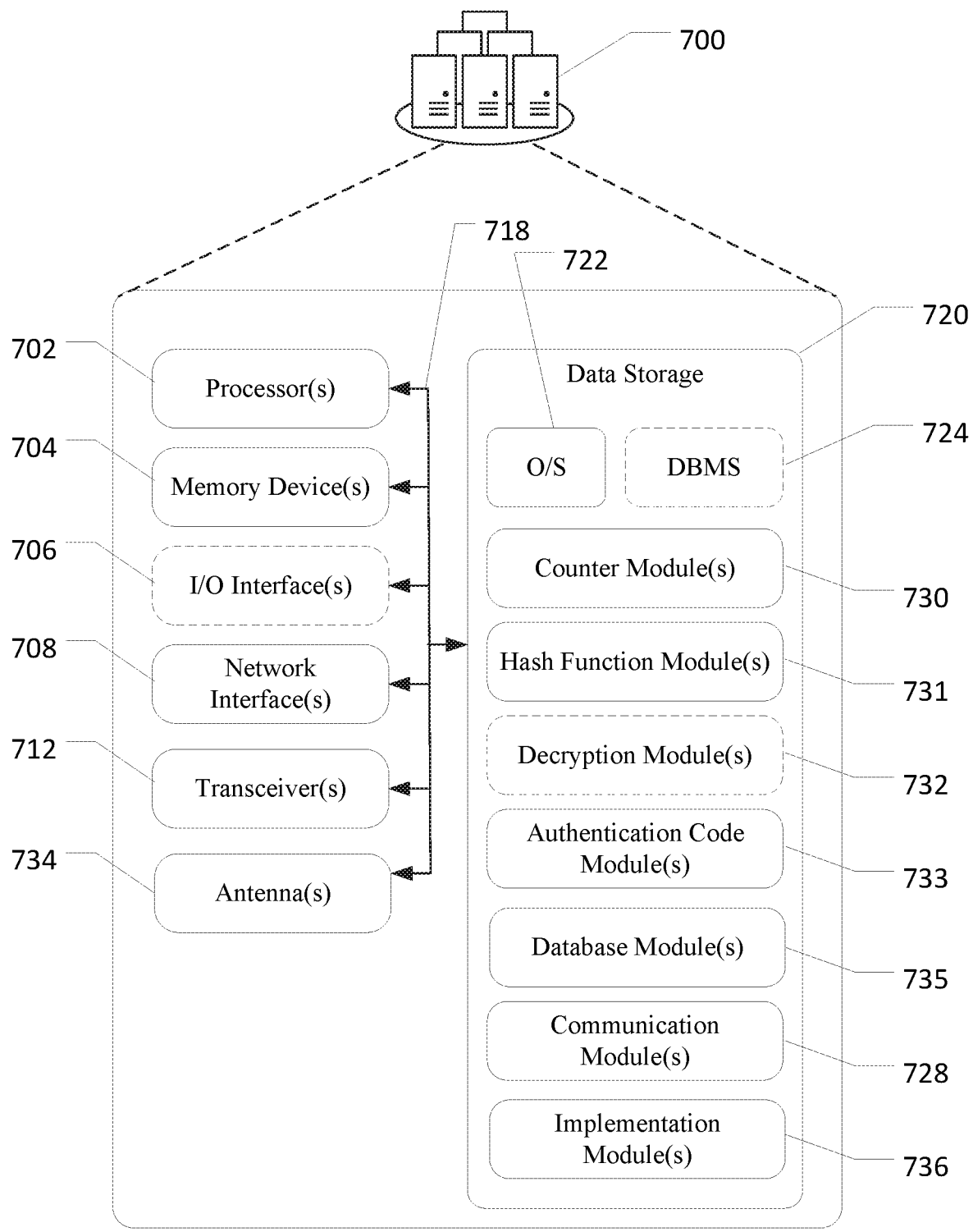
FIG. 7 is a schematic block diagram of one or more servers in accordance with one or more example embodiments of the disclosure.

FIG. 7 is a schematic block diagram of an illustrative server 700 in accordance with one or more example embodiments of the disclosure. The server 700 may be one or more servers and may include any suitable computing device capable of receiving and/or sending data, and may optionally be coupled to devices including, but not limited to, electronic devices such as a smartphone, tablet, e-reader, wearable device, or the like; a connected device; a desktop computer; a laptop computer; a content streaming device; a set-top box; one or more servers; datastores; or the like. The server 700 may correspond to an illustrative device configuration for server 130, server 430, and any other servers of FIGS. 1-5.

The server 700 may be configured to communicate via one or more networks with one or more servers, search engines, user devices, electronic devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 700 may include one or more processors (processor(s)) 702, one or more memory device(s) 704 (generically referred to herein as memory 704), one or more optional input/output (I/O) interface(s) 706, one or more network interface(s) 708, one or more transceiver(s) 712, one or more antenna(s) 734, and data storage 720. The server 700 may further include one or more buses 718 that functionally couple various components of the server 700. These various components will be described in more detail hereinafter.

The server 700 may further include one or more antenna (e) 734 that may have the same or substantially the same features, operation, and/or functionality as described above with respect to antenna(e) 634. The bus(es) 718 may have the same or substantially the same features, operation, and/or functionality as described above with respect to bus(es) 618. The memory 704 may have the same or substantially the same features, operation, and/or functionality as described above with respect to memory 604.

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more optional database management systems (DBMS) 724; and one or more program module(s), applications, engines, computer-executable code, scripts, or the like such as, for example, one or more counter module(s) 730, one or more hash function module(s) 731, one or more optional encryption module(s) 732, one or more authentication code module(s) 733, one or more database module(s) 735, one or more communication module(s) 728, and/or one or more implementation module(s) 736. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the server device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the counter module(s) 730 may include computer-executable instructions, code, or the like that are responsive to execution by one or more of the processor(s) 702 may perform functions including, but not limited to, maintain a count which may or may not correspond to temporal information. In one example, the counter module(s) 730 may be programmed to start at a certain value and may be incrementally increased or decreased. In another example, the count may correspond to time, which may or may not be synchronized with the time in the location in which server 700 or electronic device 600 is located. Counter module(s) 730 may be periodically synchronized with counter module(s) 630($s$) of electronic device 600 of FIG. 6 such that counter module(s) 630 and counter module(s) 730 determine or generate the same counter value.

The hash function module(s) 731 may include computer-executable instructions, code, or the like that are responsive to execution by one or more of the processor(s) 702 may perform functions including, but not limited to, determining a hash function key. The hash function module(s) 731 may determine a hash function key based on a unique identifier (i.e., seed value) and/or device identifier. For example, the hash function key may be determined using a KDF. The unique identifier device identifier of the electronic device may be used as input. In one example, the KDF may generate a hash function key that may be a hash-based message authentication code (HMAC) key.

The optional decryption module(s) 732 may include computer-executable instructions, code, or the like that responsive to execution by one or more of the processor(s) 702 may perform functions including, but not limited to, determining a decryption key and decrypting a payload. Decryption module(s) 732 may determine an encryption key and/or a decryption key using a KDF with the unique identifier and counter data as inputs. Decryption module(s) 732 may use the decryption key to decrypt the payload.

The authentication code module(s) 733 may include computer-executable instructions, code, or the like that are responsive to execution by one or more of the processor(s) 702 may perform functions including, but not limited to, determining an authentication code. The authentication code module(s) 733 may determine an authentication code using the hash function key and counter data (e.g., counter values). For example, the hash function key and counter data may be used to derive the authentication code and/or the authentication code may be based on the hash function key and counter data. The counter data used may be truncated or otherwise abbreviated. In the example where the hash function key is an HMAC key, an HMAC may be performed using the HMAC key and counter data to determine the authentication code. The authentication code may be an HMAC. The authentication code 121 may be truncated or otherwise abbreviated.

The database module(s) 735 may include computer-executable instructions, code, or the like that are responsive to execution by one or more of the processor(s) 702 may perform functions including, but not limited to, determining a subset of records corresponding to authentication codes and corresponding information such as payloads, product data, counter data, unique identifiers, and/or signal data. Database module (s) 735 may determine a subset of records corresponding to counter data, product data, another other signal related information, for example. Database module(s) 735 may also maintain a table of records corresponding to the authentication code, unique identifiers, device identifiers product data, counter data, account data, decryption key, and any other data corresponding to the signal. Database module(s) 735 may further maintain a table of received signals from connected devices 120 or 420.

The communication module(s) 728 may include computer-executable instructions, code, or the like that are responsive to execution by one or more of the processor(s) 702 may perform functions including, but not limited to, communicating with one or more devices, for example, via wired or wireless communication, communicating with electronic devices, user devices, mobile devices, communicating with servers (e.g., remote servers), communicating with remote datastores and/or databases, sending or receiving notifications or commands/directives, communicating with cache memory data, communicating with user devices, and the like.

The implementation module(s) 736 may include computer-executable instructions, code, or the like that are responsive to execution by one or more of the processor(s) 702 may perform functions including, but not limited to, overseeing coordination and interaction between modules and computer executable instructions in data storage 720, determining user selected actions and tasks, determining actions associated with user interactions, determining actions associated with user input, determining user devices associated with a user account, sending signals to user devices, electronic devices, other computing devices, servers, datastores and the like, initiating commands locally or at electronic devices, and the like.

Referring now to other illustrative components depicted as being stored in the data storage 720, the O/S 622 may be loaded from the data storage 720 into the memory 704 and may provide an interface between other application software executing on the electronic device 700 and hardware resources of the electronic device 700. More specifically, the O/S 722 may include a set of computer-executable instructions for managing hardware resources of the electronic device 700 and for providing common services to other application programs (e.g., managing memory allocation among various application programs). In certain example embodiments, the O/S 722 may control execution of the other program module(s) for content rendering. The O/S 722 may include any operating system now known or which may be developed in the future including, but not limited to, any server operating system, any mainframe operating system, or any other proprietary or non-proprietary operating system.

The optional DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 700, the optional input/output (I/O) interface(s) 706 may have the same or substantially the same features, operation, and/or functionality as described above with respect to input/output (I/O) interface(s) 606. The server device 700 may further include one or more network interface(s) 708 via which the server 700 may communicate with any of a variety of other systems, platforms, networks, devices, and so forth. The network interface(s) 708 may enable communication, for example, with one or more electronic devices, connected devices, mobile devices, one or more wireless routers, one or more host servers, one or more web servers, and the like via one or more of networks. The transceiver(s) 712 may have the same or substantially the same features, operation, and/or functionality as described above with respect to transceiver(s) 612.

It should be appreciated that the program module(s), applications, computer-executable instructions, code, or the like depicted in FIG. 6 as being stored in the data storage 620, or depicted in FIG. 7 as being stored in the data storage 720, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device 600, server 700 and/or hosted on other computing device(s) accessible via one or more networks, may be provided to support functionality provided by the program module(s), applications, or computer-executable code depicted in FIG. 6, FIG. 7 and/or additional or alternate functionality. Further, functionality may be modularized differently such that processing described as being supported collectively by the collection of program module(s) depicted in FIG. 6 and/or FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 and/or FIG. 7 may be implemented, at least partially, in hardware and/or firmware across any number of devices.

It should further be appreciated that the electronic device 600 and/or server 700 may include alternate and/or additional hardware, software, or firmware components beyond those described or depicted without departing from the scope of the disclosure. More particularly, it should be appreciated that software, firmware, or hardware components depicted as forming part of the electronic device 600 and/or server 700 are merely illustrative and that some components may not be present or additional components may be provided in various embodiments. While various illustrative program module(s) have been depicted and described as software module(s) stored in data storage 620 and/or data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example of programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining a plurality of records, the plurality of records comprising a first record associated with a first account, the first record including a unique identifier of a device associated with the first account, a device identifier associated with the device, a first counter value, and a first authentication code based on the unique identifier, device identifier, and the first counter value;
   determining the first authentication code, wherein determining the first authentication code includes,
      determining a hash function key using a key derivation function (KDF) with the unique identifier and the device identifier as inputs, and
      determining the first authentication code based on the hash function key and first counter value,
      wherein the first authentication code associates the device identifier with the unique identifier;
   receiving a signal from the device, after determining the first authentication code, the signal comprising a second counter value, a second authentication code generated from the second counter value and the unique identifier, and a payload;
   determining that at least a portion of the first authentication code matches at least a portion of the second authentication code;
   determining that the second authentication code is associated with the unique identifier based on the at least a portion of first authentication code matching the at least a portion of the second authentication code;
   determining information associated with the device based on the payload in the signal;
   sending the information to a database to be saved on the database and associated with the first account; and
   determining an action based on the information.

2. The method of claim 1, wherein the first authentication code is a hash-based message authentication code (HMAC).

3. The method of claim 1, wherein information associated with the signal comprises at least one of location data, health data, and sensor data.

4. The method of claim 1, wherein the payload is encrypted by the device using an encryption key and further comprising:

determining a decryption key via a key derivation function (KDF) with the unique identifier and the first counter value as inputs; and decrypting the payload using the decryption key.

5. The method of claim 4, wherein the decryption key and the encryption key are Advanced Encryption Standard (AES) symmetric encryption keys.

6. The method of claim 1, further comprising sending instructions to a second device, wherein the instructions are associated with the action.

7. The method of claim 1, wherein the first counter value comprises temporal information.

8. The method of claim 1, further comprising synchronizing the first counter value and the second counter value.

9. The method of claim 1, further comprising determining a set of records4 comprising a subset of the plurality of records, wherein the subset of the plurality of records comprises records with a counter value that is below a threshold number or within a range.

10. The method of claim 1, wherein the action comprises one or more of sending a message to a second device, sending a message to the first device, recording the information or a portion thereof, or determining a location of the first device.

11. The method of claim 1, wherein the device is a remote server and further comprising:

requesting from the remote server the signal comprising a second counter value, a second authentication code generated from the second counter value and the unique identifier, and a payload.

12. The method of claim 1, further comprising:

determining to take an action based on the payload in the signal; and performing the action.

13. The method of claim 1, further comprising:

determining a decryption key using a second KDF with the unique identifier and the first counter value as inputs; and decrypting the payload using the decryption key.

14. The method of claim 13, wherein the payload was encrypted by the device using an encryption key and the decryption key and the encryption key are the same and are Advanced Encryption Standard (AES) symmetric encryption keys.

15. The method of claim 1, wherein the payload includes instructions to update a table indicative of a location of the device with respect to time.

* * * * *